(12) United States Patent
Ma (10) Patent No.: US 10,630,799 B2
(45) Date of Patent: Apr. 21, 2020

(54) METHOD AND APPARATUS FOR PUSHING INFORMATION

(71) Applicant: Baidu Online Network Technology (Beijing) Co., Ltd., Beijing (CN)

(72) Inventor: Zhen Ma, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 176 days.

(21) Appl. No.: 16/026,714

(22) Filed: Jul. 3, 2018

(65) Prior Publication Data

US 2019/0014186 A1    Jan. 10, 2019

(30) Foreign Application Priority Data

Jul. 4, 2017 (CN) .......................... 2017 1 0539487

(51) Int. Cl.
*H04L 29/08* (2006.01)
*H04L 29/12* (2006.01)

(52) U.S. Cl.
CPC .............. *H04L 67/26* (2013.01); *H04L 67/18* (2013.01); *H04L 61/103* (2013.01); *H04L 61/609* (2013.01); *H04L 61/6022* (2013.01)

(58) Field of Classification Search
CPC .......... G06Q 30/0205; G06Q 30/0261; G06Q 30/00; G06F 16/00; H04W 4/021; H04W 4/029
See application file for complete search history.

(56) References Cited

U.S. PATENT DOCUMENTS

| | | | | |
|---|---|---|---|---|
| 9,516,470 | B1* | 12/2016 | Scofield | .................. H04W 4/21 |
| 2016/0044127 | A1* | 2/2016 | Filner | ................. H04L 67/2847 |
| | | | | 709/213 |
| 2017/0069000 | A1* | 3/2017 | Duleba | ................... G06F 16/23 |
| 2017/0098228 | A1* | 4/2017 | Braun | ................ G06Q 30/0205 |
| 2017/0372358 | A1* | 12/2017 | Duque de Souza | ......................... |
| | | | | G06Q 30/0261 |
| 2018/0225687 | A1* | 8/2018 | Ahmed | ................. H04W 4/021 |

FOREIGN PATENT DOCUMENTS

WO    WO-2017041532 A1 *  3/2017 ............. G06Q 30/00

* cited by examiner

*Primary Examiner* — Shean Tokuta
(74) *Attorney, Agent, or Firm* — Seed IP Law Group LLP (57) ABSTRACT

The present disclosure discloses a method and apparatus for pushing information. A specific embodiment of the method comprises: acquiring a user identifier of each user visiting a first target area within a preset period of time; for each user identifier, determining address information corresponding to the user identifier according to the user identifier and a preset corresponding list of the user identifier and the address information; determining, in response to determining the address information being located in a second target area, a user indicated by the user identifier belonging to the second target area; determining a number of users belonging to the second target area as a first number; and generating push information based on the first number, and pushing the push information. The embodiment is conductive to improving the timeliness of the people flow status in the first target area.

12 Claims, 4 Drawing Sheets

METHOD AND APPARATUS FOR PUSHING INFORMATION

CROSS-REFERENCE TO RELATED APPLICATIONS

This application is related to and claims priority from Chinese Application No. 201710539487.4, filed on Jul. 4, 2017 and entitled "Method and Apparatus for Pushing Information," the entire disclosure of which is hereby incorporated by reference.

TECHNICAL FIELD

The present disclosure relates to the field of computer technology, specifically to the field of Internet technology, and more specifically to a method and apparatus for pushing information.

BACKGROUND

As the society develops, daily life becomes more convenient. Stores, malls, large shopping centers, etc., are usually set up near residential and working communities. People flow rates may usually be used as one of the indicators to acquire operation status of a shopping center for business to analyze.

However, in the existing technology, only the people flow rate in a certain local area near the shopping center can be analyzed. It is difficult to cover the full range of people visiting the shopping center. Meanwhile, the analysis frequency of the people flow rate is low, resulting in a low update frequency of the shopping center operation status information.

SUMMARY

An objective of the embodiments of the present disclosure is to provide an improved method and apparatus for pushing information to solve the technical problems mentioned in the foregoing background section.

In a first aspect, embodiments of the present disclosure provide a method for pushing information, the method including: acquiring a user identifier of each user visiting a first target area within a preset period of time; for each user identifier, determining address information corresponding to the user identifier according to the user identifier and a preset corresponding list of the user identifier and the address information; determining, in response to determining the address information being located in a second target area, a user indicated by the user identifier belonging to the second target area; determining a number of users belonging to the second target area as a first number; and generating push information based on the first number, and pushing the push information.

In some embodiments, the generating push information based on the first number includes: acquiring a total number of users having addresses located in the second target area; determining a ratio of the first number to the total number of users; and generating the push information based on the ratio.

In some embodiments, the acquiring a total number of users having addresses located in the second target area includes: counting a number of users having a number of appearances in the second target area higher than a preset threshold value within the preset period of time as a second number; and defining the second number as the total number of users.

In some embodiments, the acquiring a user identifier of each user visiting a first target area within a preset period of time includes: acquiring, in response to a terminal used by the user enabling a wireless connection within the preset period of time, a Media Access Control (MAC) address of the terminal; and using the MAC address as the user identifier.

In some embodiments, the first target area includes a closed boundary formed by preset geographic coordinates. Before the acquiring a user identifier of each user visiting a first target area within a preset period of time, the method further includes: determining, in response to the user sending location data information within the preset period of time, geographic coordinates indicated by the location data information as a first set of geographic coordinates; determining whether a location of the user is within the closed boundary based on the first set of geographic coordinates; and determining, in response to the location of the user being within the closed boundary, the user visiting the first target area.

In some embodiments, the method further includes a step of creating the list, and the creating includes: acquiring, in response to the user publicizing location data information through the terminal, the user identifier of the user and geographic coordinates as a second set of geographic coordinates; determining the address information of the user based on the second set of geographic coordinates; and creating the list based on the determined user identifier and the address information corresponding to the user identifier.

In a second aspect, the embodiments of the present disclosure provide an apparatus for pushing information, the apparatus including: an acquiring unit, configured to acquire a user identifier of each user visiting a first target area within a preset period of time; an address information determining unit, configured to, for each user identifier, determine address information corresponding to the user identifier according to the user identifier and a preset corresponding list of the user identifier and the address information; a second target area determining unit, configured to determine, in response to determining the address information being located in a second target area, a user indicated by the user identifier belonging to the second target area; a first number determining unit, configured to determine a number of users belonging to the second target area as a first number; and a push information generating unit, configured to generate push information based on the first number, and push the push information.

In some embodiments, the push information generating unit includes: a total number determining subunit, configured to acquire a total number of users having addresses located in the second target area; a ratio determining subunit, configured to determine a ratio of the first number to the total number of users; and a push information generating subunit, configured to generate the push information based on the ratio.

In some embodiments, the total number determining subunit is further configured to count a number of users having a number of appearances in the second target area higher than a preset threshold value within the preset period of time as a second number; and define the second number as the total number of users.

In some embodiments, the acquiring unit is further configured to acquire, in response to a terminal used by the user enabling a wireless connection within the preset period of time, a Media Access Control (MAC) address of the terminal; and use the MAC address as the user identifier.

In some embodiments, the first target area includes a closed boundary formed by preset geographic coordinates. The apparatus includes: a first geographic coordinate determining unit, configured to determine, in response to the user sending location data information within the preset period of time, geographic coordinates indicated by the location data information as a first set of geographic coordinates; a closed boundary determining unit, configured to determine whether a location of the user is within the closed boundary based on the first set of geographic coordinates; and a first target area determining subunit, configured to determine, in response to the location of the user being within the closed boundary, the user visiting the first target area.

In some embodiments, the apparatus further includes a list creating unit. The creating includes: acquiring, in response to the user publicizing location data information through the terminal, the user identifier of the user and geographic coordinates as a second set of geographic coordinates; determining the address information of the user based on the second set of geographic coordinates; and creating the list based on the determined user identifier and the address information corresponding to the user identifier.

In a third aspect, the embodiments of the present disclosure provide a server, including: one or more processors; and a storage device configured to store one or more programs. The one or more programs, when executed by the one or more processors, cause the one or more processors to implement the method as described in any implementation in the first aspect.

In a fourth aspect, the embodiments of the present disclosure provide a computer readable storage medium storing a computer program. The computer program, when executed by a processor, implements the method as described in any implementation in the first aspect.

According to the method and apparatus for pushing information provided by the embodiments of the present disclosure, in the embodiments, the user identifier of each user visiting the first target area is acquired, next, for each user identifier, the address information corresponding to the user identifier is determined, then, in a premise of the address information being located in the second target area, it is determined that the user indicated by the user identifier belongs to the second target area, and then, the number of users visiting the first target area and having addresses belonging to the second target area is determined, and the push information is generated based on the number to be pushed. According to this method, the first number may be determined in real time and comprehensively, and the flow rate of the users having addresses located in the second target area and visiting the first target area may be accurately grasped, which helps to improve the timeliness of the people flow status in the first target area. Through the people flow status, operating statuses of some businesses such as a store and a mall may be effectively grasped.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
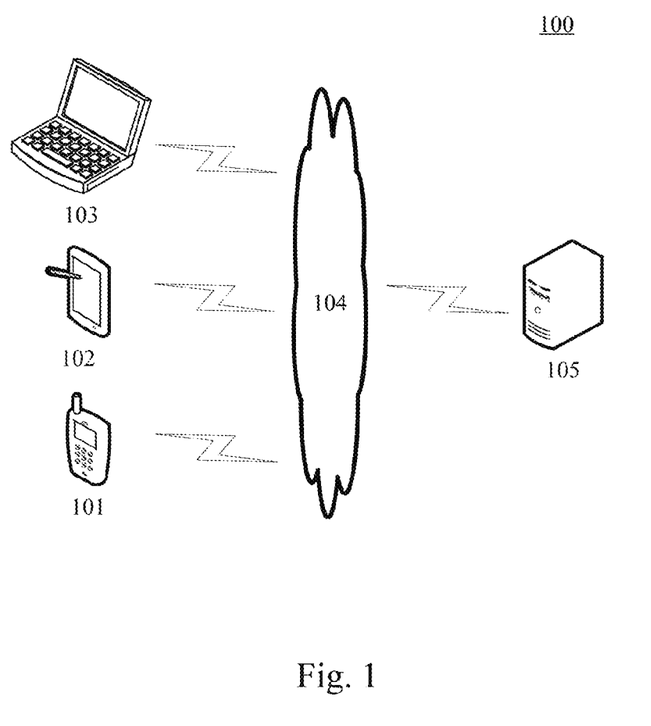
FIG. 1 is an exemplary system architecture diagram in which the embodiments of the present disclosure may be applied.

FIG. 1 shows an exemplary architecture of a system 100 which may be used by a method for pushing information or a apparatus for pushing information according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. For example, the server 105 may acquire user identifiers from the terminal devices 101, 102 and 103 through the network 104.

The terminal devices 101, 102 and 103 may be various electronic devices having display screens and supporting information browsing, including but not limited to, smart phones, tablet computers, laptop computers and desktop computers.

The server 105 may be a server providing various services, for example, a backend server that acquires user identifiers from the terminal devices 101, 102 and 103. The backend server may determine a number of users visiting a first target area and having addresses belonging to a second target area according to the user identifiers, and generate a processing result and return the processing result to the terminal devices 101, 102 and 103.

It should be noted that the method for pushing information according to the embodiments of the present disclosure is generally executed by the server 105. Accordingly, an apparatus for pushing information is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
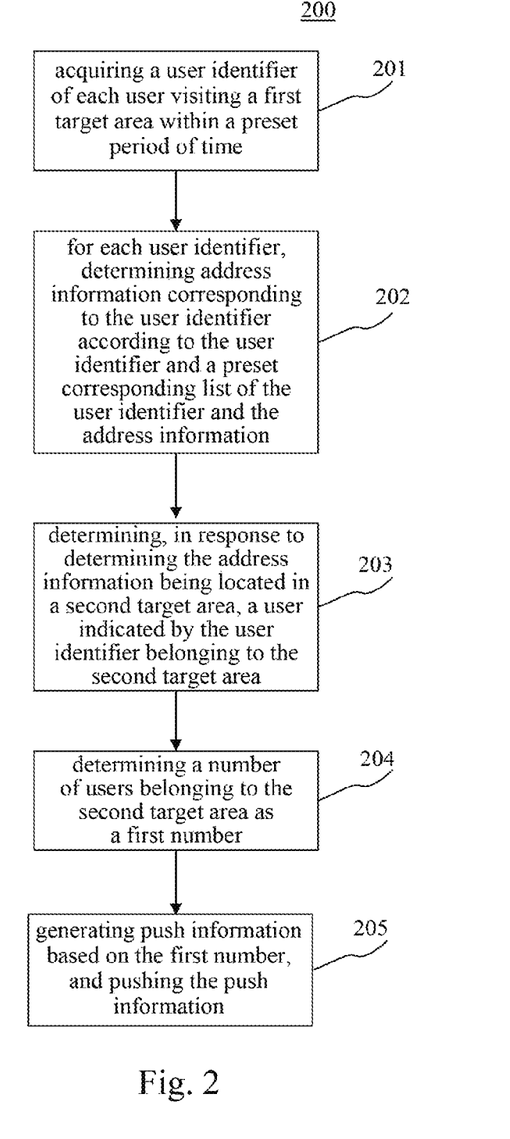
FIG. 2 is a flowchart of an embodiment of a method for pushing information according to the present disclosure.

Further referring to FIG. 2, FIG. 2 illustrates a flow 200 of an embodiment of a method for pushing information according to the present disclosure. The method for pushing information includes the following steps.

Step 201, acquiring a user identifier of each user visiting a first target area within a preset period of time.

In this embodiment, an electronic device (e.g., the server 105 as illustrated in FIG. 1) on which the method for pushing information is performed may acquire the user identifier of the user from a terminal device (e.g., the terminal devices 101, 102 and 103 as illustrated in FIG. 1) by means of a wired connection or a wireless connection. The user identifier may be composed of a number, a letter, a symbol, etc., to uniquely identify the user. For example, the user identifier may include, but is not limited to, an equipment identifier of a piece of equipment used by the user, an identity card number of the user, etc. When the user identifier is an equipment identifier, the equipment identifier may also include a unique International Mobile Equipment Identity (IMEI) number, and the IMEI may be used to identify Global System for Mobile Communication and Wideband Code Division Multiple Access (WCDMA) for cell phones and globally unique numbers for some satellite phones. The equipment identifier may also include a MAC address, an equipment serial number, etc.

Herein, the first target area may be a certain store, a certain mall, a commercial center within a range of a certain area, or the like. Generally, the user enters these stores to purchase items, and enters a shopping center to do shopping, eating, etc. The server may acquire the user identifier of each user visiting the first target area within the preset period of time. Herein, the preset period of time may be manually set or may be set by default. The preset period of time may be 1 day, 1 month, 3 months, etc., and is set according to actual needs.

When visiting the first target area, the user generally sends location services, information searches, etc. through a network using the terminal in the first target area. For example, the user sends location data information through a map software and acquires food stores nearby through a search software. When the terminal used by the user performs search and location operations, the server may acquire the user identifier according to the location information sent by the user or the search operation.

In some alternative implementations of this embodiment, when the user visits the first target area, the server may also detect whether the terminal device used by the user enables the wireless connection within the preset period of time. Herein, the wireless connection manner may be a 3G/4G connection, and may be a WIFI connection, a Bluetooth connection, a WiMAX connection, a Zigbee connection, an Ultra Wideband (UWB) connection, and the like. In response to the terminal used by the user enabling the wireless connection within the preset period of time, the server may acquire a Media Access Control (MAC) address of the terminal. Each terminal device has a unique MAC address. Therefore, the MAC address may be used as a user identifier. Herein, when the wireless connection enabled by the user is the 3G/4G connection, the server may use a 3G/4G probe to capture the MAC address of the user. When the wireless connection enabled by the user is the WIFI connection, the server may use a WIFI probe to capture the MAC address of the equipment used by the user.

Step 202, for each user identifier, determining address information corresponding to the user identifier according to the user identifier and a preset corresponding list of the user identifier and the address information.

In this embodiment, the server pre-stores the list, and the list stores the user identifier and the address information corresponding to the user identifier. The address information may be residential address information, work address information, etc., of the user indicated by the user identifier. For each user identifier, the user identifier of the user determined in step 201 may be compared with a user identifier in the preset list, to determine whether the user identifier of the user matches the user identifier in the list. When the user identifier of each user determined in step 201 successfully matches the user identifier in the preset list, the address information of the user may be acquired from the list.

In some alternative implementations of this embodiment, a step of creating the list is also included. The creating step includes the following steps. First, in response to publicizing of location data information by the user through the terminal, the user identifier of the user and geographic coordinates are acquired. The location data information may include the location information sent by the user through the map software, and may also be common address information of the user set by the user through the terminal software. When a WIFI wireless network of the user is enabled, the server may also locate the user through the WIFI probe to determine the location of the user. According to the location data information publicized by the user, the server may acquire the user identifier of the user and the geographic coordinates corresponding to the user identifier. Herein, the geographic coordinates may include latitude and longitude coordinates. Next, the server may determine the address information of the user according to the geographic coordinates. Finally, the list is created based on the determined user identifier and the address information corresponding to the user identifier. It should be noted that the address information corresponding to the user identifier may include one piece of address information, and may also include two pieces of address information, three pieces of address information, etc., which is not limited herein.

Step 203, determining, in response to determining the address information being located in a second target area, a user indicated by the user identifier belonging to the second target area.

In general, there are a plurality of second target areas around the first target area. The second target areas may be a residential area, an office building, and the like, around the first target area. In this embodiment, according to the address information of the user determined in step 202, in this step, the server may determine whether the determined address information is located in the second target area. The server may determine that the user indicated by the user identifier belongs to the second target area, in response to the determined address information being located in the second target area.

Step 204, determining a number of users belonging to the second target area as a first number.

In this embodiment, according to the user identifier of each user belonging to the second target area determined in step 203, in this step, the number of users belonging to the second target area may be determined, and the number is determined as the first number.

Step 205, generating push information based on the first number, and pushing the push information.

In this embodiment, based on the first number determined in step 204, in this step, the push information may be generated according to the first number and the push information is pushed. Herein, the push information includes the number of users belonging to the second target area.

In this embodiment, the user identifier of each user visiting the first target area is acquired, next, for each user identifier, the address information corresponding to the user identifier is determined, then, in a premise of the address information being located in the second target area, it is determined that the user indicated by the user identifier belongs to the second target area, and then, the number of users visiting the first target area and belonging to the second target area is determined, and the push information is generated based on the number to be pushed. According to this method, the first number may be determined in real time and comprehensively, and the flow rate of the users having addresses located in the second target area and visiting the first target area may be accurately grasped, which helps to improve the timeliness of the people flow status of the first target area.

Figure 3:
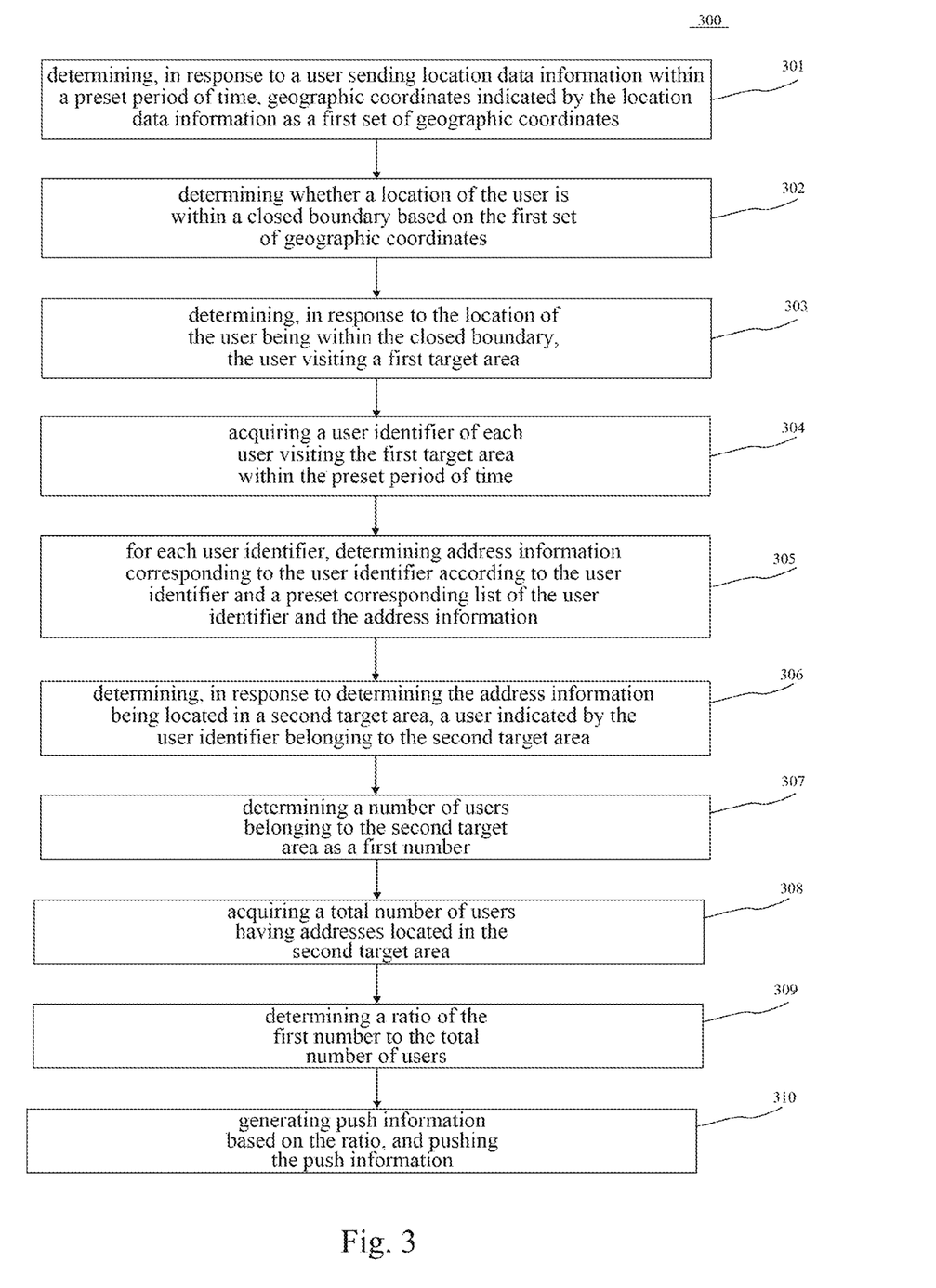
FIG. 3 is a flowchart of another embodiment of the method for pushing information according to the present disclosure.

Further referring to FIG. 3, FIG. 3 illustrates a flow 300 of another embodiment of the method for pushing information. The flow 300 of the method for pushing information includes the following steps.

Step 301, determining, in response to a user sending location data information within a preset period of time, geographic coordinates indicated by the location data information as a first set of geographic coordinates.

In this embodiment, through a wireless network, a server may detect a geographic range of the wireless network to acquire the location data information sent by the user through a terminal. The location data information may include location information sent by the user through the map software. When the WIFI wireless network of the user is enabled, the server may also locate the user through a WIFI probe to determine a location of the user. According to the location data information publicized by the user, the server may acquire a user identifier of the user and geographic coordinates corresponding to the user identifier. Herein, the geographic coordinates may include latitude and longitude coordinates. In response to the user sending location data information within the preset period of time, the server may determine the geographic coordinates indicated by the location data information, and use the geographic coordinates as the first set of geographic coordinates.

Step 302, determining whether a location of the user is within a closed boundary based on the first set of geographic coordinates.

In this embodiment, a first target area may include a closed boundary formed by preset geographic coordinates. According to the first set of geographic coordinates determined in step 301, the server may further determine whether the location of the user is within the closed boundary. Herein, if the closed boundary may be a triangular boundary, the preset geographic coordinates may include latitude and longitude coordinates of three vertexes of the triangular boundary. If the closed boundary may be a quadrilateral boundary, the preset geographic coordinates may include latitude and longitude coordinates of four vertexes of the quadrilateral boundary. If the closed boundary may be a circular boundary, the preset geographic coordinates may include latitude and longitude coordinates of multiple hash points located within the closed boundary. In general, the location of the user is generally indicated by the geographic coordinates. Therefore, the server may determine whether the location of the user is within the closed boundary by determining the latitude and longitude coordinates corresponding to the first set of geographic coordinates. For example, the server may compare the acquired first set of geographic coordinates of the user with the preset geographic coordinates to determine. As another example, the server may first form a hash set of latitude and longitude coordinates, which is based on the closed boundary, according to the closed boundary, and then compare the geographic coordinates with the latitude and longitude coordinates in the set of latitude and longitude coordinates one by one. When the first set of geographic coordinates fall in an area indicated by one set of latitude and longitude coordinates in the set of the latitude and longitude coordinates, it is determined that the location of the user is within the closed boundary. When the first set of geographic coordinates fall outside an area indicated by each set of latitude and longitude coordinates in the set of the latitude and longitude coordinates, it is determined that the location of the user is outside the closed boundary.

Step 303, determining, in response to the location of the user being within the closed boundary, the user visiting a first target area.

In this embodiment, according to the step 302 in which whether the location of the user is within the closed boundary is determined, in this step, in response to the location of the user being within the closed boundary, it may be determined that the user has visited the first target area.

Herein, the server may simultaneously acquire the location information publicized through the software by the user and the location information of the user detected by the WIFI probe, and match and confirm the location information of the user acquired through the two ways. When both the locations of the user acquired through the two ways are within the closed boundary, it may be determined that the user has visited the first target area.

Step 304, acquiring a user identifier of each user visiting the first target area within the preset period of time.

In this embodiment, an electronic device (e.g., the server 105 as illustrated in FIG. 1) on which the method for pushing information is performed may acquire the user identifier of the user from a terminal device (e.g., the terminal devices 101, 102 and 103 as illustrated in FIG. 1) by means of a wired connection or a wireless connection. The user identifier may be composed of a number, a letter, a symbol, etc., to uniquely identify the user. For example, the user identifier may include, but is not limited to, an equipment identifier of a piece of equipment used by the user, an identity card number of the user, etc.

Step 305, for each user identifier, determining address information corresponding to the user identifier according to the user identifier and a preset corresponding list of the user identifier and the address information.

In this embodiment, the server pre-stores the list, and the list stores the user identifier and the address information corresponding to the user identifier. The address information may be residential address information, work address information, etc., of the user indicated by the user identifier. For each user identifier, the user identifier of the user determined in step 304 may be compared with a user identifier in the preset list, to determine whether the user identifier of the user matches the user identifier in the list. When the user identifier of each user determined in step 304 successfully matches the user identifier in the preset list, the address information of the user may be acquired from the list.

Step 306, determining, in response to determining the address information being located in a second target area, a user indicated by the user identifier belonging to the second target area.

In this embodiment, according to the address information of the user determined in step 305, in this step, the server may determine whether the determined address information is located in the second target area. The server may determine that the user indicated by the user identifier belongs to the second target area, in response to the determined address information being located in the second target area.

Step 307, determining a number of users belonging to the second target area as a first number.

In this embodiment, according to the user identifier of each user belonging to the second target area determined in step 306, in this step, the number of users belonging to the second target area may be determined, and the number is determined as the first number.

Step 308, acquiring a total number of users having addresses located in the second target area.

In this embodiment, the second target area is generally a residential area, an office building, and the like. Therefore, the number of people located in the second target area is usually relatively fixed. The server may acquire the total number of users whose addresses are in the second target area. The total number may be acquired by visiting a server supported by websites of the second target area, and may also be acquired through the location data information of the user.

In some alternative implementations of this embodiment, the WIFI probe may be set within a range of the second target area. When the user enters the range of the second target area and enables the WIFI, the server may capture a MAC address of the user. The server may count the number of appearances of the MAC address of the user to determine the number of appearances of the user in the range of the second target area. The server may count a number of users having a number of appearances in the second target area higher than a preset threshold value within the preset period of time as a second number, and determine the second number as the total number of the users.

Step 309, determining a ratio of the first number to the total number of users.

In this embodiment, according to step 307 in which the number of users belonging to the second target area is determined as the first number and step 308 in which the total number of users having addresses located in the second target area is determined, in this embodiment, the ratio of the first number to the total number of users may be determined.

Step 310, generating push information based on the ratio, and pushing the push information.

In this embodiment, based on the ratio determined in step 309, in this step, the push information may be generated according to the ratio, and the push information may be pushed. Herein, the push information includes the ratio of the first number to the total number of users.

As may be seen from FIG. 3, compared with the embodiment corresponding to FIG. 2, the flow 300 of the method for pushing information in this embodiment emphasizes the step about how to determine the users visiting the first target area, and determine the ratio of the number of users visiting the first target area and belonging to the second target area to the total number of users having addresses located in the second target area, so as to more accurately determine the users visiting the first target area and the number of users belonging to the second target area and visiting the first target area, which makes the people flow in the first target area more objective and comprehensive.

Figure 4:
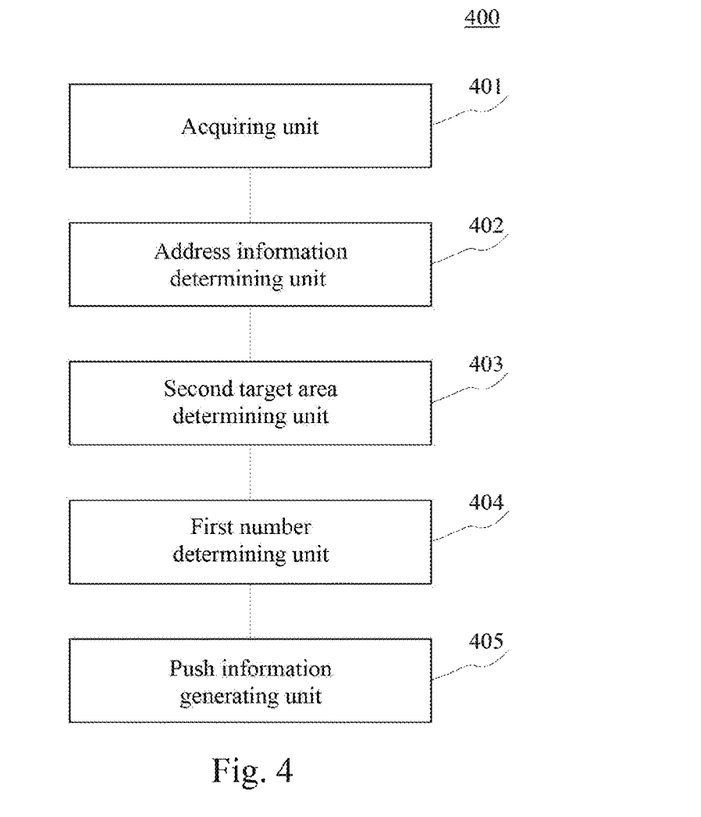
FIG. 4 is a schematic structural diagram of an embodiment of an apparatus for pushing information according to the present disclosure.

Further referring to FIG. 4, as an implementation of the method shown in each of the above-mentioned drawings, the present disclosure provides an embodiment of an apparatus for pushing information. The embodiment of this apparatus corresponds to the embodiment of the method as illustrated in FIG. 2, and this apparatus may be applied in various electronic devices.

As shown in FIG. 4, the apparatus for pushing information 400 in this embodiment may include: an acquiring unit 401, an address information determining unit 402, a second target area determining unit 403, a first number determining unit 404 and a push information generating unit 405. The acquiring unit 401 is configured to acquire a user identifier of each user visiting a first target area within a preset period of time. The address information determining unit 402 is configured to, for each user identifier, determine address information corresponding to the user identifier according to the user identifier and a preset corresponding list of the user identifier and the address information. The second target area determining unit 403 is configured to determine, in response to determining the address information being located in a second target area, a user indicated by the user identifier belonging to the second target area. The first number determining unit 404 is configured to determine a number of users belonging to the second target area as a first number. The push information generating unit 405 is configured to generate push information based on the first number, and push the push information.

In this embodiment, for specific processes of the acquiring unit 401, the address information determining unit 402, the second target area determining unit 403, the first number determining unit 404 and the push information generating unit 405 in the apparatus for pushing information 400, and their technical effects, reference may be made to relative descriptions of step 201, step 202, step 203, step 204 and step 205 in the corresponding embodiment of FIG. 2 respectively, which will not be repeatedly described here.

In some alternative implementations of this embodiment, the apparatus for pushing information 400 may further include: a total number determining subunit (not shown) configured to acquire a total number of users having addresses located in the second target area; a ratio determining subunit (not shown) configured to determine a ratio of the first number to the total number of users; and a push information generating subunit (not shown) configured to generate the push information based on the ratio.

In some alternative implementations of this embodiment, the total number determining subunit is further configured to count a number of users having a number of appearances in the second target area higher than a preset threshold value within the preset period of time as a second number; and define the second number as the total number of users.

In some alternative implementations of this embodiment, the acquiring unit is further configured to acquire, in response to the terminal used by the user enabling a wireless connection within the preset period of time, a Media Access Control (MAC) address of the terminal; and use the MAC address as the user identifier.

In some alternative implementations of this embodiment, the first target area includes a closed boundary formed by preset geographic coordinates. The apparatus further includes: a first geographic coordinate determining unit (not shown) configured to, determine, in response to the user sending location data information within the preset period of time, geographic coordinates indicated by the location data information as a first set of geographic coordinates; a closed boundary determining unit (not shown) configured to determine whether a location of the user is within the closed boundary based on the first set of geographic coordinates; and a first target area determining subunit (not shown) configured to determine, in response to the location of the user being within the closed boundary, the user visiting the first target area.

Figure 5:
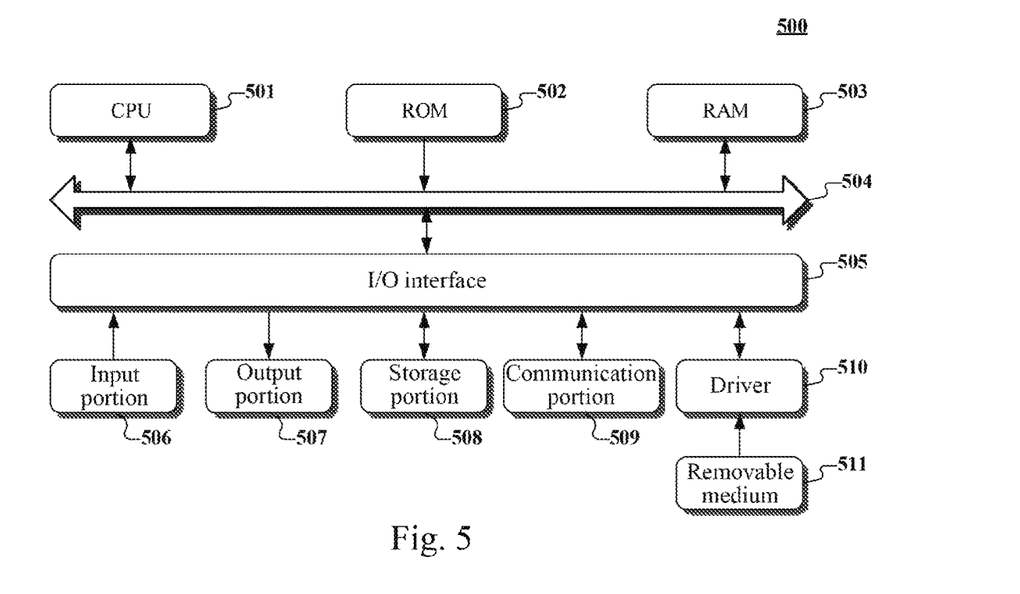
FIG. 5 is a schematic structural diagram of a computer system adapted to implement a server according to the embodiments of the present disclosure.

Referring to FIG. 5, a schematic structural diagram of a computer system 500 adapted to implement a server of the embodiments of the present disclosure is shown. The server shown in FIG. 5 is merely an example, but does not impose any restrictions on the function and scope of embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising an acquiring unit, an address information determining unit, a second target area determining unit, a first number determining unit and a push information generating unit, where the names of these units do not in some cases constitute a limitation to such units themselves. For example, the acquiring unit may also be described as "a unit for acquiring a user identifier of each user visiting a first target area within a preset period of time".

In another aspect, the present disclosure further provides a computer-readable storage medium. The computer-readable storage medium may be the computer storage medium included in the server in the above described embodiments, or a stand-alone computer-readable storage medium not assembled into the server. The computer-readable storage medium stores one or more programs. The one or more programs, when executed by a device, cause the device to: acquiring a user identifier of each user visiting a first target area within a preset period of time; for each user identifier, determining address information corresponding to the user identifier according to the user identifier and a preset corresponding list of the user identifier and the address information; determining, in response to determining the address information being located in a second target area, a user indicated by the user identifier belonging to the second target area; determining a number of users belonging to the second target area as a first number; and generating push information based on the first number, and pushing the push information.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for pushing information, the method comprising:

acquiring a user identifier of each user visiting a first target area within a preset period of time;

for each user identifier, determining address information corresponding to the user identifier according to the user identifier and a preset corresponding list of the user identifier and the address information;

determining, in response to determining the address information being located in a second target area, a user indicated by the user identifier belonging to the second target area;

determining a number of users belonging to the second target area as a first number; and generating push information based on the first number, and pushing the push information.

2. The method according to claim 1, wherein the generating push information based on the first number comprises:

acquiring a total number of users having addresses located in the second target area;

determining a ratio of the first number to the total number of users; and generating the push information based on the ratio.

3. The method according to claim 2, wherein the acquiring a total number of users having addresses located in the second target area comprises:

counting a number of users having a number of appearances in the second target area higher than a preset threshold value within the preset period of time as a second number; and defining the second number as the total number of users.

4. The method according to claim 1, wherein the acquiring a user identifier of each user visiting a first target area within a preset period of time comprises:

acquiring, in response to a terminal used by the user enabling a wireless connection within the preset period of time, a Media Access Control (MAC) address of the terminal; and using the MAC address as the user identifier.

5. The method according to claim 4, wherein the first target area comprises a closed boundary formed by preset geographic coordinates; and before the acquiring a user identifier of each user visiting a first target area within a preset period of time, the method further comprises:

determining, in response to the user sending location data information within the preset period of time, geographic coordinates indicated by the location data information as a first set of geographic coordinates;

determining whether a location of the user is within the closed boundary based on the first set of geographic coordinates; and determining, in response to the location of the user being within the closed boundary, the user visiting the first target area.

6. The method according to claim 1, further comprising a step of creating the list, wherein the creating comprises:

acquiring, in response to the user publicizing location data information through a terminal, the user identifier of the user and geographic coordinates as a second set of geographic coordinates;

determining the address information of the user based on the second set of geographic coordinates; and creating the list based on the determined user identifier and the address information corresponding to the user identifier.

7. An apparatus for pushing information, the apparatus comprising:

at least one processor; and a memory storing instructions, the instructions when executed by the at least one processor, cause the at least one processor to perform operations, the operations comprising:

acquiring a user identifier of each user visiting a first target area within a preset period of time;

for each user identifier, determining address information corresponding to the user identifier according to the user identifier and a preset corresponding list of the user identifier and the address information;

determining, in response to determining the address information being located in a second target area, a user indicated by the user identifier belonging to the second target area;

determining a number of users belonging to the second target area as a first number; and generating push information based on the first number, and push the push information.

8. The apparatus according to claim 7, wherein the generating push information based on the first number comprises:

acquiring a total number of users having addresses located in the second target area;

determining a ratio of the first number to the total number of users; and generating the push information based on the ratio.

9. The apparatus according to claim 8, wherein the acquiring a total number of users having addresses located in the second target area comprises:

counting a number of users having a number of appearances in the second target area higher than a preset threshold value within the preset period of time as a second number; and defining the second number as the total number of users.

10. The apparatus according to claim 7, wherein the acquiring a user identifier of each user visiting a first target area within a preset period of time comprises:

acquiring, in response to a terminal used by the user enabling a wireless connection within the preset period of time, a Media Access Control (MAC) address of the terminal; and using the MAC address as the user identifier.

11. The apparatus according to claim 10, wherein the first target area comprises a closed boundary formed by preset geographic coordinates; and before the acquiring a user identifier of each user visiting a first target area within a preset period of time, the operations comprise:

determining, in response to the user sending location data information within the preset period of time, geographic coordinates indicated by the location data information as a first set of geographic coordinates;

determining whether a location of the user is within the closed boundary based on the first set of geographic coordinates; and determining, in response to the location of the user being within the closed boundary, the user visiting the first target area.

12. A non-transitory computer storage medium storing a computer program, the computer program when executed by one or more processors, causes the one or more processors to perform operations, the operations comprising:

acquiring a user identifier of each user visiting a first target area within a preset period of time;

for each user identifier, determining address information corresponding to the user identifier according to the user identifier and a preset corresponding list of the user identifier and the address information;

determining, in response to determining the address information being located in a second target area, a user indicated by the user identifier belonging to the second target area;

determining a number of users belonging to the second target area as a first number; and generating push information based on the first number, and pushing the push information.

* * * * *